Oct. 11, 1955　　W. E. FRANK ET AL　　2,720,136
PROJECTOR

Filed Feb. 18, 1952　　4 Sheets-Sheet 1

Inventors:
Wallace Frank
Herman P. Schack
George J. Kreier, Jr.
by their Attorneys
Howson & Howson

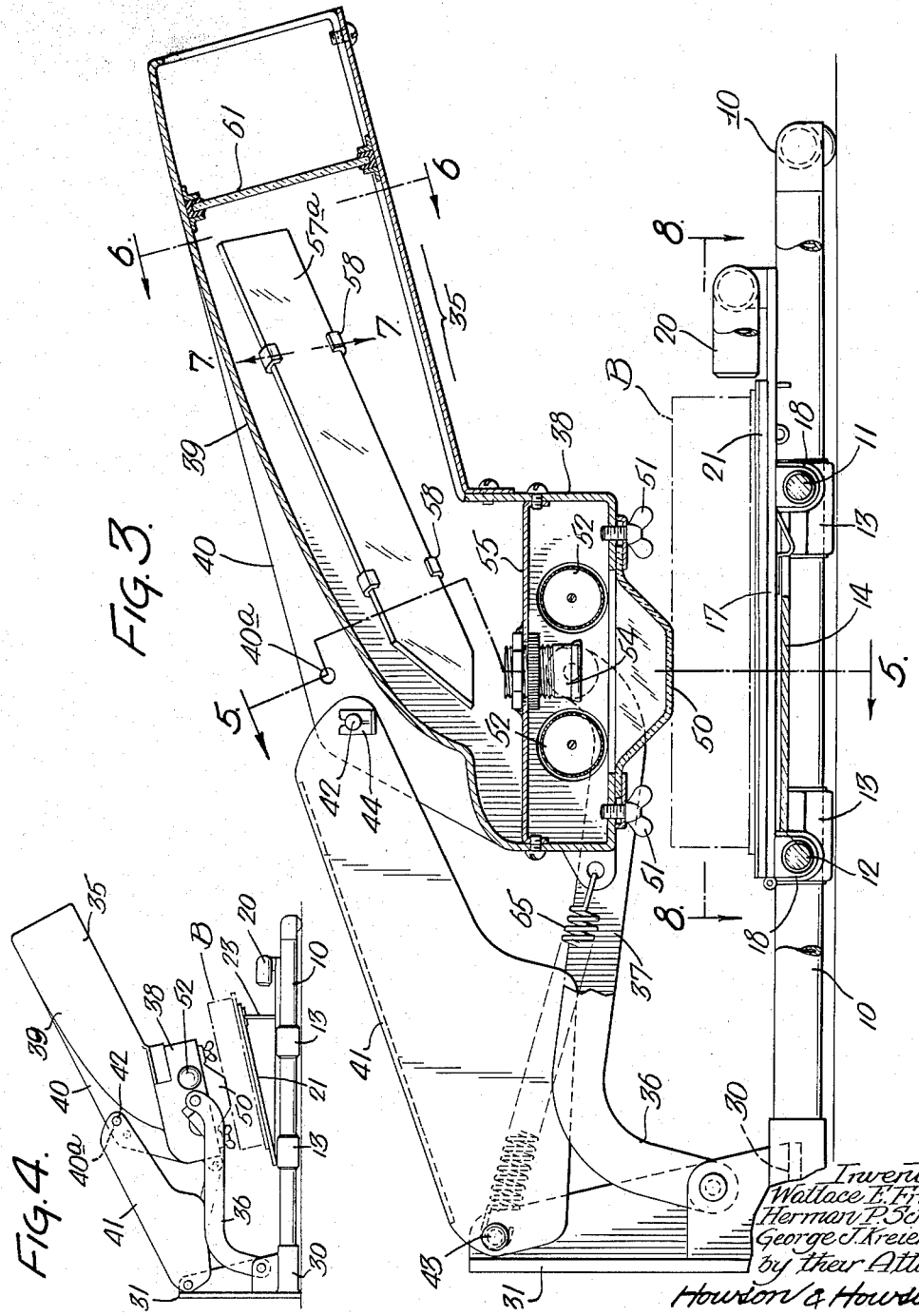

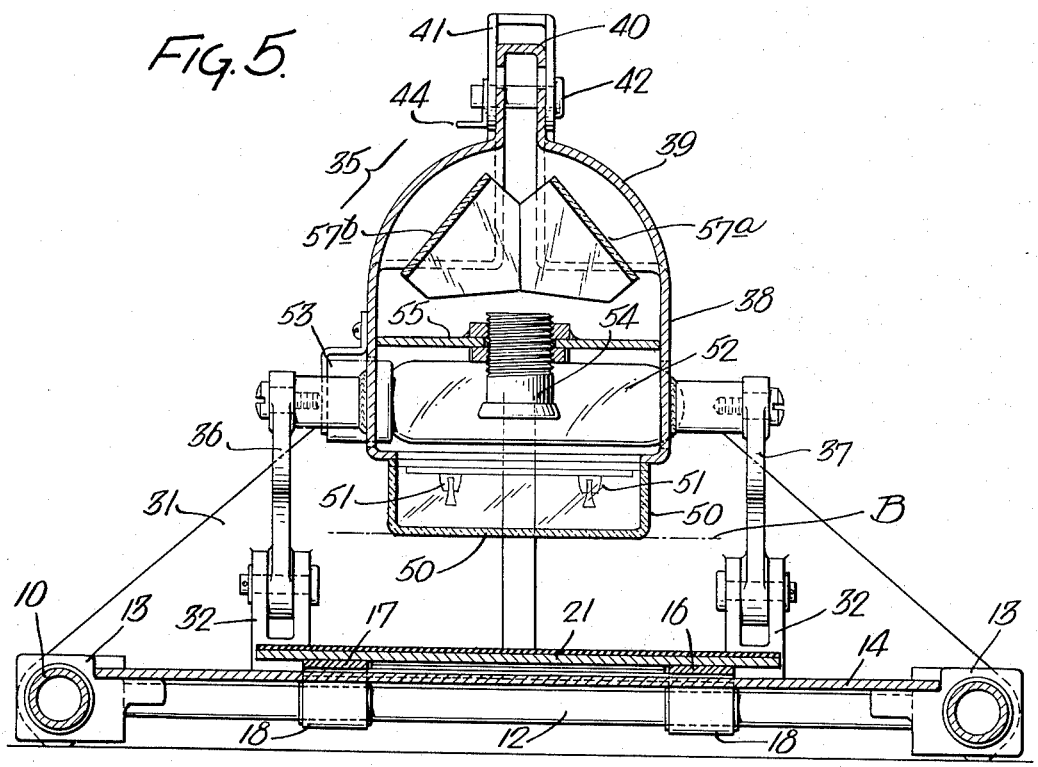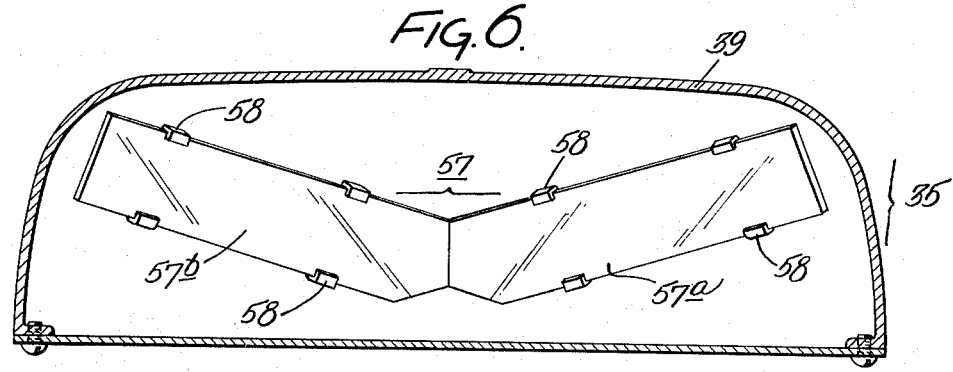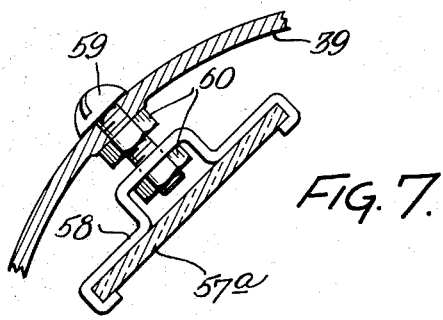

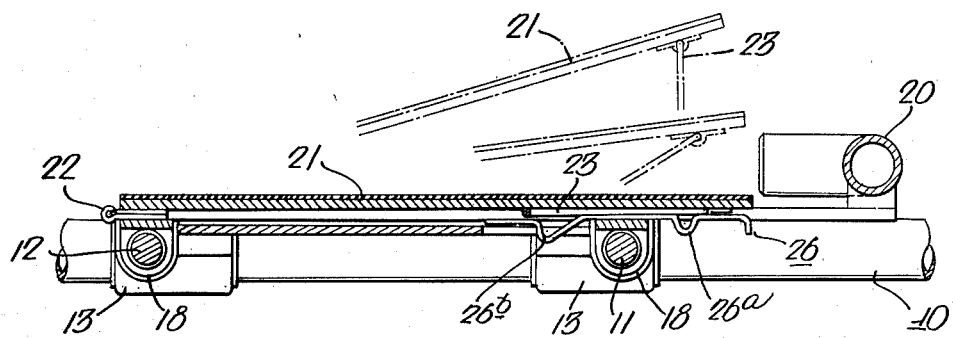
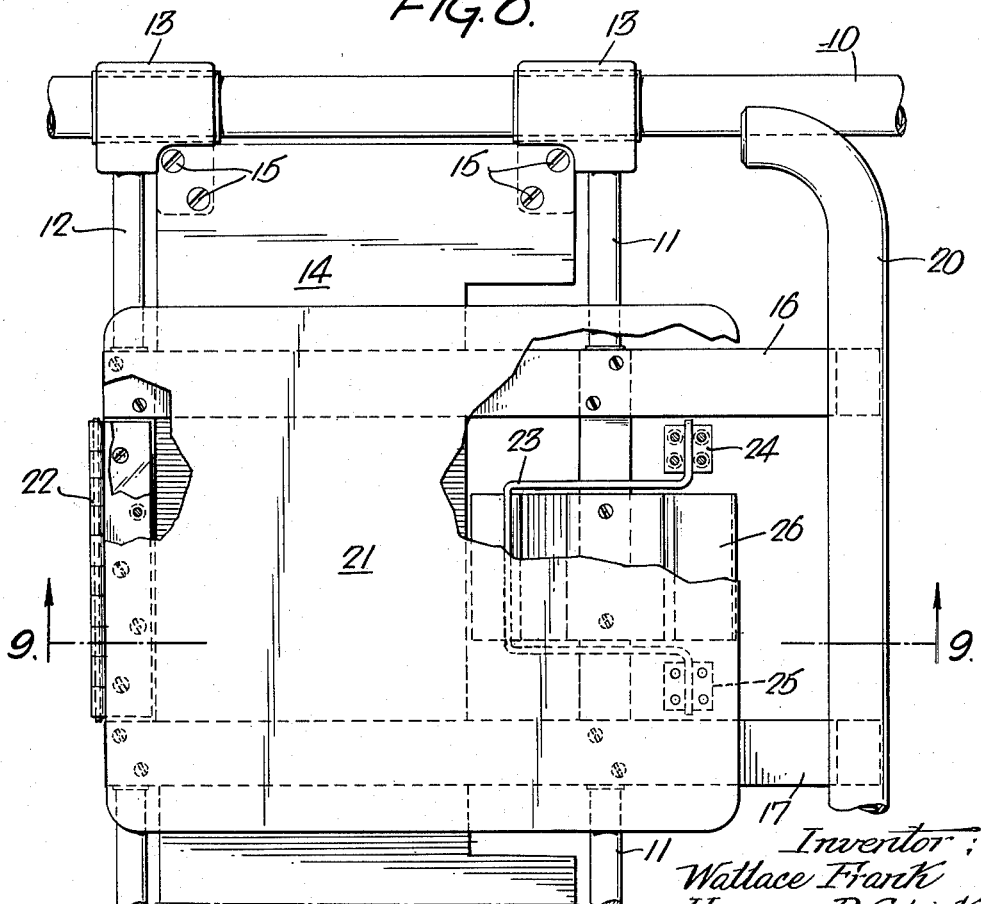

United States Patent Office 2,720,136
Patented Oct. 11, 1955

2,720,136

PROJECTOR

Wallace E. Frank, Kintnersville, and Herman P. Schick and George J. Kreier, Jr., Philadelphia, Pa., assignors to W. K. Kellogg Foundation, Battle Creek, Mich., a corporation of Michigan Application February 18, 1952, Serial No. 272,052

3 Claims. (Cl. 88—24)

This invention relates to projectors and more particularly to a magnifying projector used for reading books, manuscripts and the like.

The present invention is an improved projector of the type disclosed and claimed in co-pending Schick et al. application Serial No. 177,504, filed August 3, 1950, now U. S. Patent No. 2,691,916, issued October 19, 1954.

A primary object of the invention is to provide a magnifying projector suitable for reading books and manuscripts which has a self-contained light source and which utilizes two angularly disposed mirrors to project the image from the lens to a viewing screen.

A further object of the invention is to provide in a projector of the type described a simple and inexpensive optical system which permits a true image to be projected on the viewing screen, so that the object viewed may be placed right side up on the carriage.

A further object is to provide in a projector of the class described a special viewing box for resting on the top of the object being projected and which serves to maintain proper spacing for lens focus.

A further object of the invention is to provide in a projector of the class described means for readily adjusting the angle of the projector so that it may be used by persons of differing eye levels.

Further objects will be apparent from the specification and drawings in which:

Fig. 3 is a side elevation on an enlarged scale of the device of Figs. 1 and 2 in which part of the structure is longitudinally sectioned;

Fig. 4 is a view similar to Fig. 3, but on a reduced scale showing the projector housing and carriage in an elevated position;

Fig. 5 is a transverse sectional view as seen at 5—5 of Fig. 3;

Fig. 6 is a transverse section of the mirror housing as seen at 6—6 of Fig. 3;

Fig. 7 is an enlarged sectional detail as seen at 7—7 of Fig. 3;

Fig. 8 is a fragmentary detail partly broken away as seen at 8—8 of Fig. 3; and, Fig. 9 is a sectional view as seen at 9—9 of Fig. 8.

Figure 1:
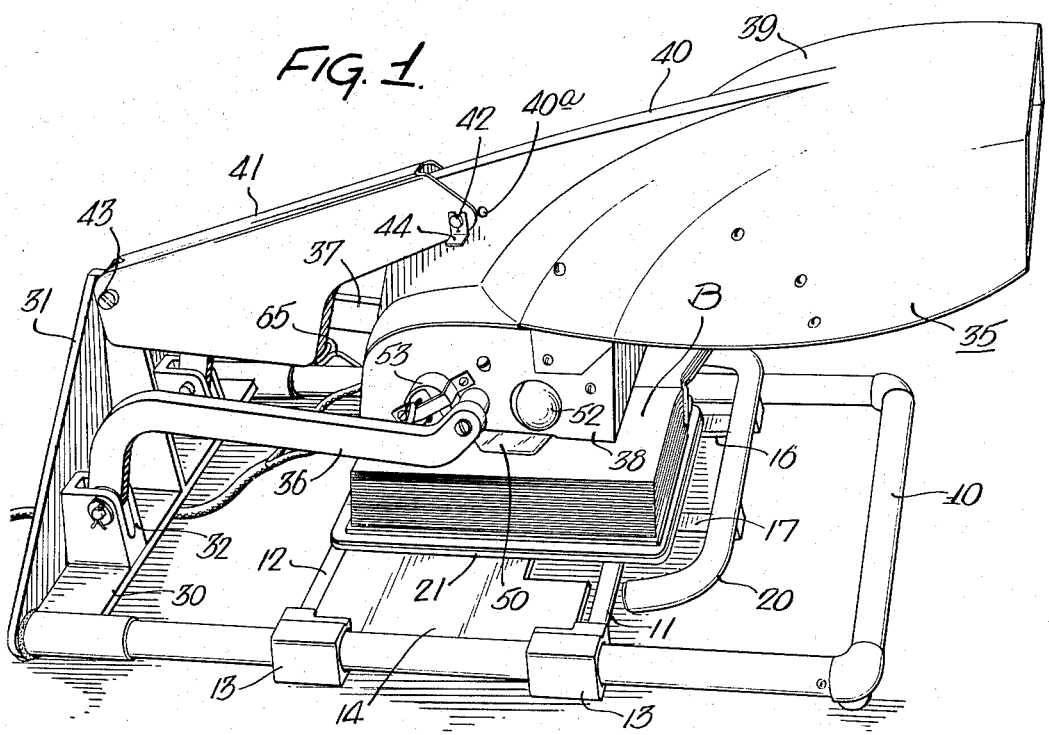
Fig. 1 is a perspective of our improved projector showing one side and the top thereof.
Figure 2:
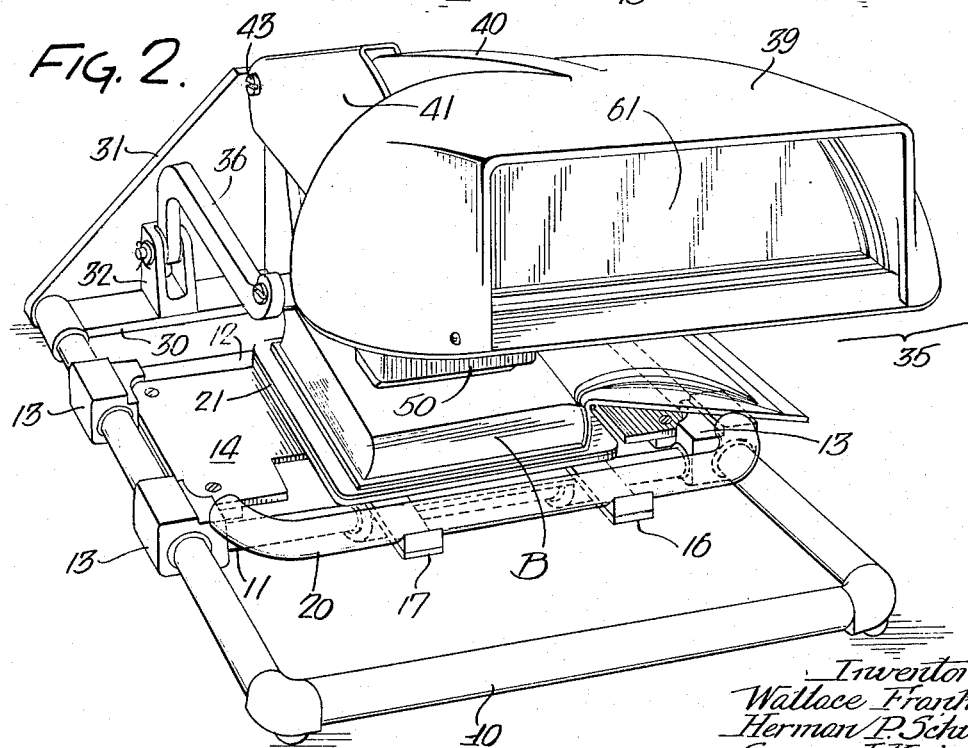
Fig. 2 is a perspective, generally showing the front of the projector in Fig. 1.

The invention comprises essentially the provision of an optical projection housing mounted on a spring loaded parallelogram linkage. The linkage is supported on a frame which has a carriage slidable back and forth both longitudinally and transversely of the frame. The projector housing has a transparent spacing cup or dish which rests lightly on the top of a book or manuscript placed on the carriage. A pair of lights in the housing project rays onto the object thence through a lens and onto a viewing screen through the medium of two reflecting surfaces arranged so that the image on the screen is substantially magnified and not inverted.

Referring now more particularly to the drawings, a preferred embodiment of the present invention comprises a supporting base or frame 10 which carries a pair of cross arms 11 and 12 slidable on the frame 10 through permanently lubricated blocks 13, 13. Cross arms 11 and 12 are conveniently spaced by a plate 14 secured to each of the blocks at 15, 15 (Fig. 8). A pair of upper cross arms 16 and 17 are transversely slidable on cross arms 11 and 12 through self-lubricating sleeves or bushings 18, 18. The entire carriage assembly is manually movable on the frame 10 by means of a handle 20 secured to the forwardly projecting ends of cross members 16 and 17. A platform 21 is pivotally supported on cross members 16 and 17 by a hinge 22 at the back, and tiltable adjustment for the platform is provided as shown in Figs. 8 and 9 by means of a bracket 23 secured to the underside of platforms 21 at 24 and 25. A plate 26 is provided with a plurality of grooves 26a and 26b in which the bracket 23 may be anchored to support the platform 21 in one or more elevated positions as shown in Fig. 9.

The rear of frame 10 is provided with a cross member 30 which carries a central elevated support 31 and a pair of laterally spaced blocks 32, 32 for the projector housing designated generally at 35. Side arms 36 and 37 are pivotally supported in blocks 32, 32 at one end, and to the bulb housing 38 at the other end. The mirror housing 39 is provided with an integral central web 40 pivoted to a connecting link 41 by a removable pin 42. Link 41 is pivoted to the support 31 at 43. Pin 42 may be readily removed and inserted into the proper hole 40a in web 40 when it is desired to operate the projector at an adjusted elevated position such as shown in Fig. 4. In this event, the platform 21 is raised to the proper tilted position and the pin 42 is inserted in a different hole in web 40 by removing the spring lock clip 44. This sufficiently shortens the top parallelogram linkage so that satisfactory focusing and operation are maintained.

Particular attention is directed to the construction of the viewer housing 35 as shown in Figs. 3, 5 and 6. A transparent spacing cup or dish 50 is clamped to the bottom of the bulb housing 38 by means of wing bolts 51, 51. The illumination for the projector is provided by a pair of bulbs 52, 52 which are supported in sockets 53 on opposite sides of the bulb housing 38. In this construction, it is not necessary to disassemble the housing to replace bulbs, and it is not necessary to remove covers to determine whether both bulbs are lit because each bulb is clearly visible from outside the projector.

A lens 54 is adjustably and removably supported in the top plate 55 of the bulb housing 38. When it becomes desirable to vary the magnification of the projector, it is a simple matter to remove the spacing cup 50 whereupon a cup having a different depth can be substituted and the lens 54 may then be readily replaced or adjusted.

The lens 54 is so positioned that light rays are directed onto a mirror assembly 57 (Fig. 6) which operates on the principle of the common roof prism and comprises two plane mirrors 57a and 57b mounted by means of brackets 58, 58 so that the mirrors intersect at 90°. It is important that the intersection of the planes of the mirrors be at 90° and it is desirable that the center line of lens 54 bisects the angle between the mirrors as shown in Fig. 5. Initial adjustment for the mirrors to provide proper setting thereof with respect to lens 54 can be conveniently made by means of screws 59, 59 and lock nuts 60, 60 when the projector is assembled.

The image from a book or manuscript B is ultimately projected and reflected onto a convenient viewing screen 61 near the front of the mirror housing 39 and the location of the screen will be at the focus for any lens and spacing cup used. In order to improve the uniformity of the image on the screen, we employ a combination screen and Fresnel lens 61. The weight of the viewing assembly 35 is conveniently counterbalanced by means of a spring 65 so that the housing can be easily raised and lowered to permit pages to be turned and other objects to be inserted on the platform 21.

We have thus described a simple inexpensive projector which is ideally adapted for use by those having impaired vision. The magnification and clarity of the image are excellent and the manuscript being read can be readily moved under the lens while proper focus is maintained. It is of great importance that a true image on the screen be obtained since the operator would be greatly confused in moving the carriage and turning the pages if it were necessary to place the book upside down on the carriage. The present device incorporates features whereby proper focus may be maintained regardless of the thickness of the material and regardless of the angle at which the projector may be tilted.

Having thus described our invention, we claim:

1. An image projector, comprising a supporting framework, a movable carriage supported by said framework, adjustable means on said carriage for supporting an object to be viewed in a desired position, a housing, a parallelogram linkage swingably supporting said housing, a light-transmitting spacer member secured to said housing and engageable with the object to be viewed, a light source in said housing from which light rays pass through said member to the object to be viewed, a lens in said housing arranged to receive light rays reflected from the object through said member, reflecting means in said housing arranged to receive light rays from said lens and to direct the light rays to a focal plane, said reflecting means comprising a pair of intersecting divergent planar reflecting surfaces disposed mutually to receive light rays from said lens and to reflect the received rays from each surface to the other surface and thence to said plane, and an image-producing screen on said housing located at said focal plane to receive the reflected light rays.

2. An image projector, comprising a support, a carriage movably supported on said support for rectilinear movement, object-supporting means on said carriage adjustable rectilinearly substantially at right angles to the movement of said carriage, a housing mounted on said support in fixed relation to the movability of an object to be viewed, whereby to enable scanning of the object, a light source in said housing arranged to impinge light rays on the object to be viewed, an image-producing system in said housing including lens means and reflecting means arranged to receive reflected light rays from the object and to direct the light rays to a focal plane, said reflecting means comprising a pair of intersecting divergent planar reflecting surfaces disposed mutually to receive light rays and to reflect the received rays from each surface to the other surface and thence to said plane, and an image-producing screen on said housing located at said focal plane to receive the reflected light rays.

3. An image projector, comprising a support, a carriage movably supported on said support for rectilinear movement, object-supporting means on said carriage adjustable rectilinearly substantially at right angles to the movement of said carriage, a housing mounted on said support in fixed relation to the movability of an object to be viewed, whereby to enable scanning of the object, a light source in said housing arranged to impinge light rays on the object to be viewed, a lens in said housing arranged to receive light rays reflected from the object, a light-transmitting spacer member on said housing below said lens to engage the object and hold it in the object plane, reflecting means in said housing arranged to receive light rays from said lens and to direct the light rays to a focal plane, said reflecting means comprising a pair of intersecting divergent planar reflecting surfaces disposed mutually to receive light rays from said lens and to reflect the received rays from each surface to the other surface and thence to said plane, and an image-producing screen on said housing located at said focal plane to receive the reflected light rays.

References Cited in the file of this patent

UNITED STATES PATENTS

| Number | Name | Date |
|---|---|---|
| 1,218,749 | Deming | Mar. 13, 1917 |
| 1,831,766 | Hanks | Nov. 10, 1931 |
| 2,047,002 | Cantwell | July 7, 1936 |
| 2,064,368 | Bausch | Dec. 15, 1936 |
| 2,260,551 | Boni | Oct. 28, 1941 |
| 2,389,503 | Guellich | Nov. 20, 1945 |
| 2,468,291 | Cole | Apr. 26, 1949 |
| 2,505,505 | Sachtleben | Apr. 25, 1950 |
| 2,558,982 | Pratt | July 3, 1951 |
| 2,579,961 | Popma | Dec. 25, 1951 |

FOREIGN PATENTS

| Number | Country | Date |
|---|---|---|
| 55,363 | Sweden | Apr. 8, 1922 |
| 453,142 | Germany | Nov. 29, 1927 |